Figure 13:
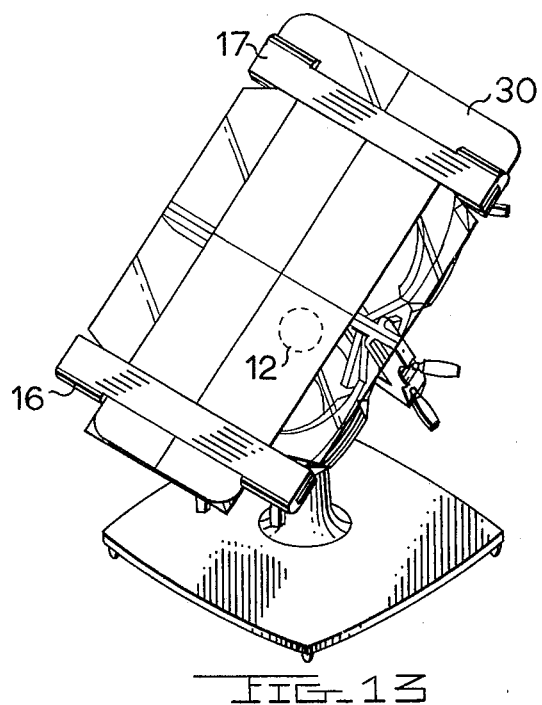

United States Patent [19]

Toby

[11] 4,340,298

[45] Jul. 20, 1982

[54] COPYHOLDER

[76] Inventor: John J. Toby, 6810 W. Fitzwater Dr., Brecksville, Ohio 44141

[21] Appl. No.: 187,593

[22] Filed: Sep. 15, 1980

[51] Int. Cl.³ .................... G03B 27/62; G03B 27/68
[52] U.S. Cl. .......................................... 355/75; 355/52
[58] Field of Search ............... 355/25, 76, 52, 72, 355/75

[56] References Cited

U.S. PATENT DOCUMENTS

| | | | |
|---|---|---|---|
| 2,095,815 | 10/1937 | Hopkins | 355/25 X |
| 2,512,182 | 6/1950 | Sussin | 355/76 |
| 2,565,446 | 8/1951 | Abbott | 355/52 X |
| 2,607,268 | 8/1952 | Bartz | 355/52 X |

FOREIGN PATENT DOCUMENTS 353977  6/1961  Switzerland .

*Primary Examiner*—Donald A. Griffin

[57] ABSTRACT

This invention relates to a copyholder for exposure of opaque copy material upon a surface unit comprising two end extensions that traverse freely, in a horizontal movement, through two slotted-center end bars that are secured to a pivotal center of an arm unit in providing for elevated or depressed positions on said flexible sheet means for various manual surface curvature adjustments.

4 Claims, 19 Drawing Figures

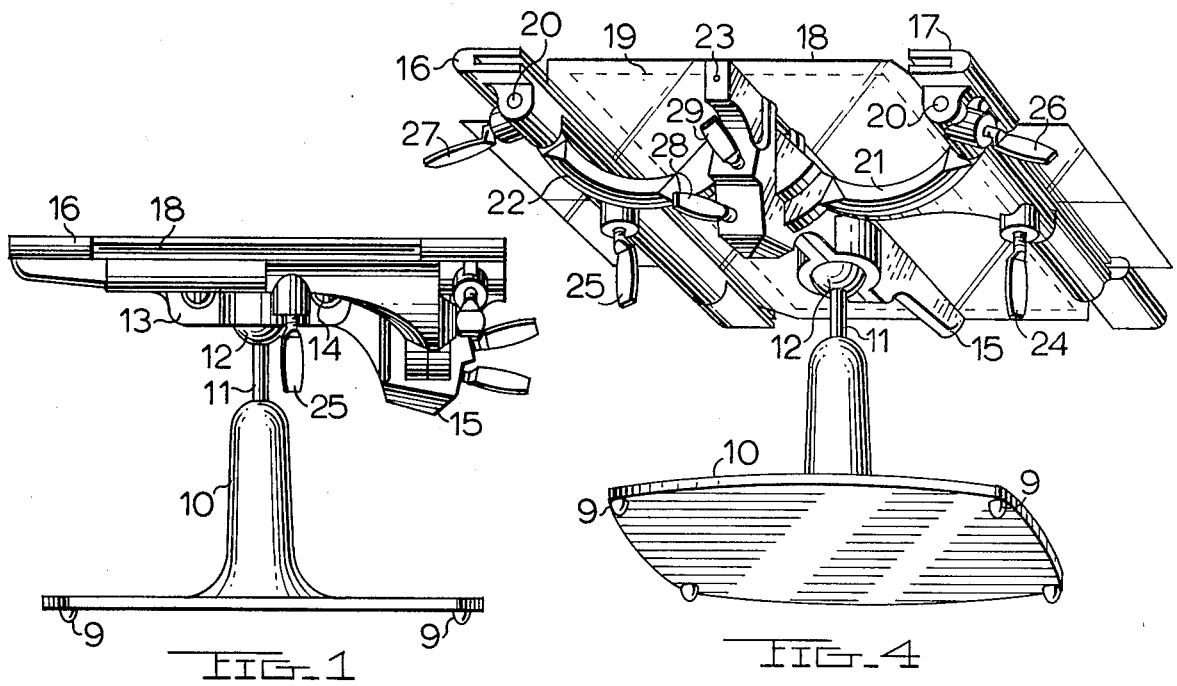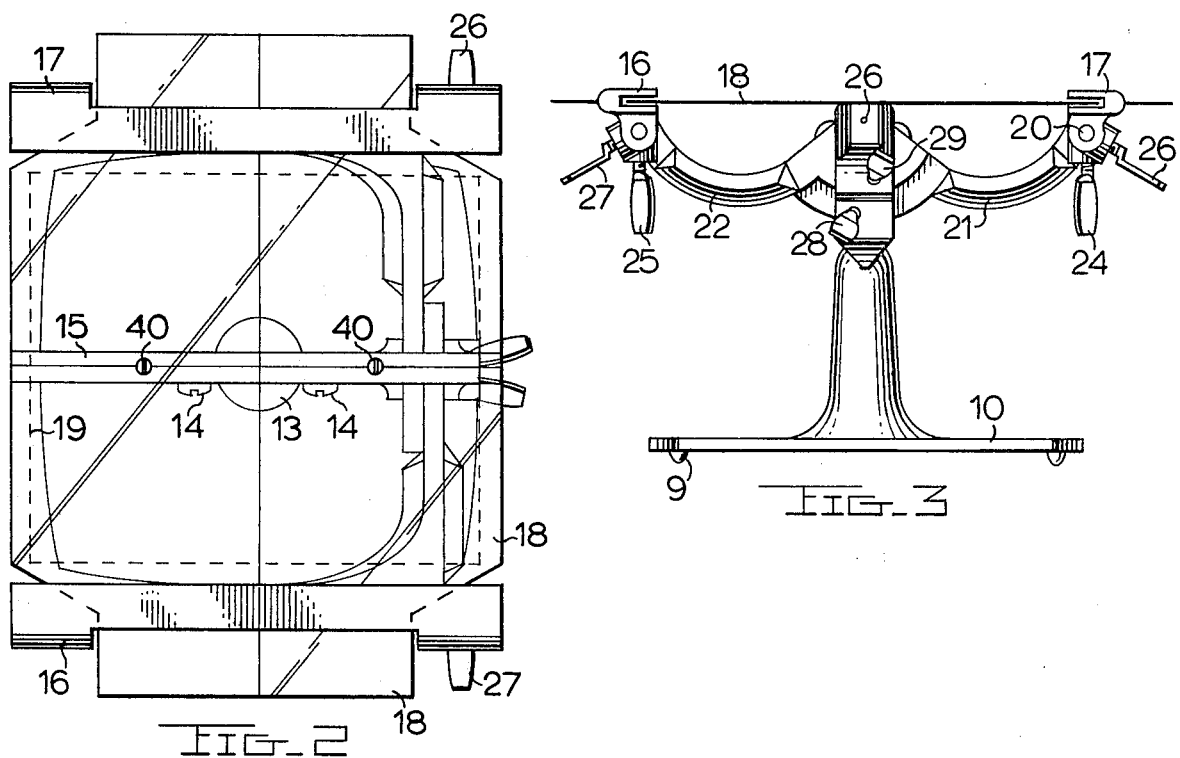

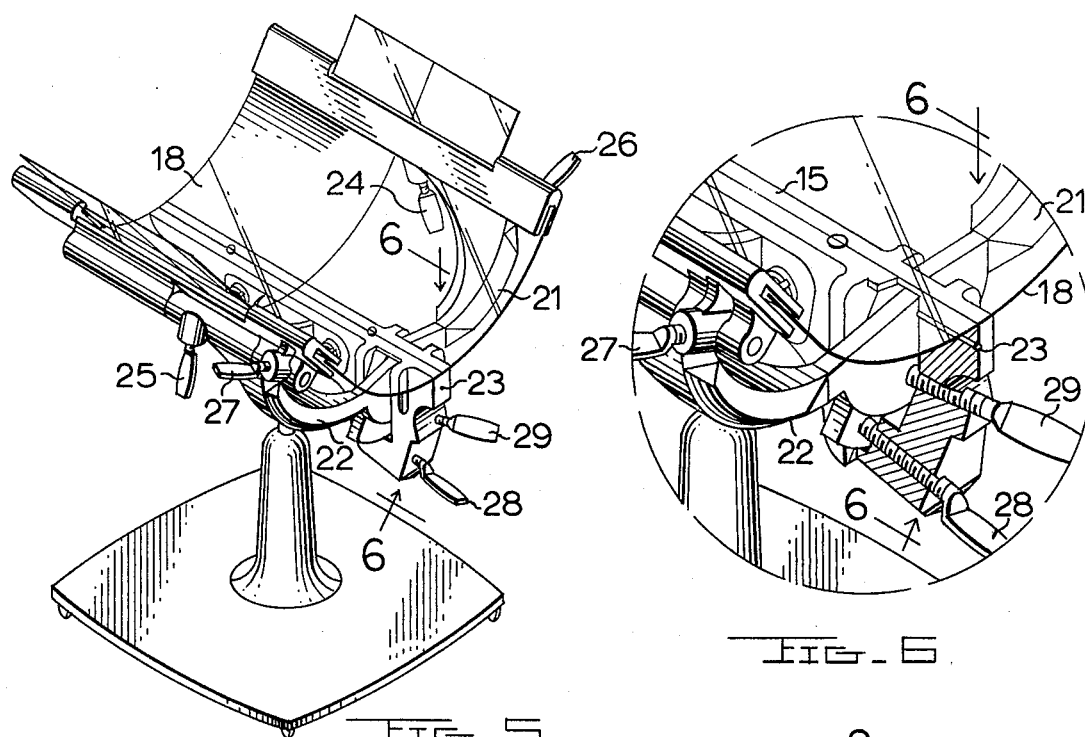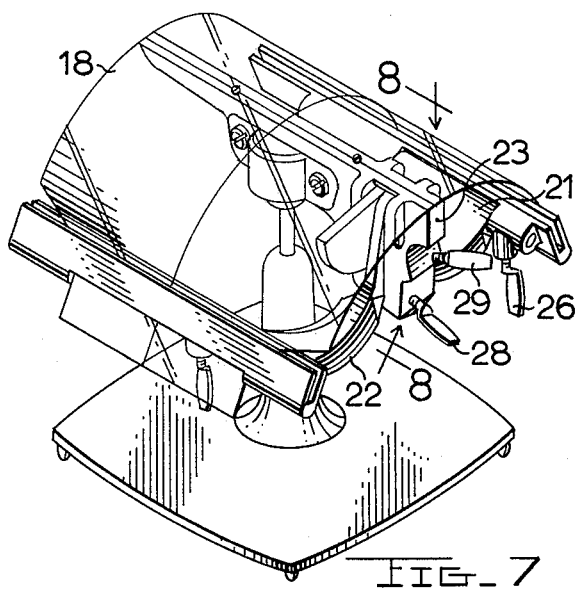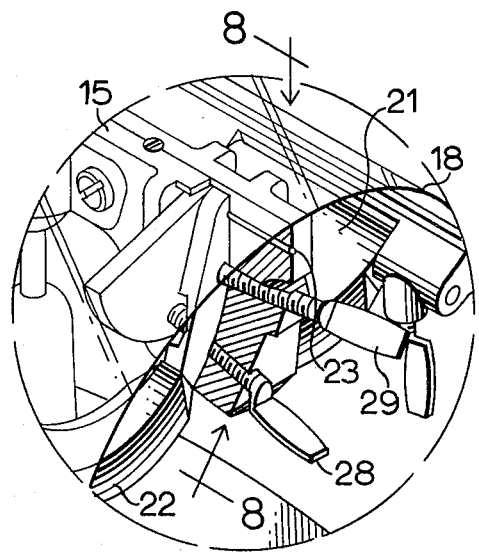

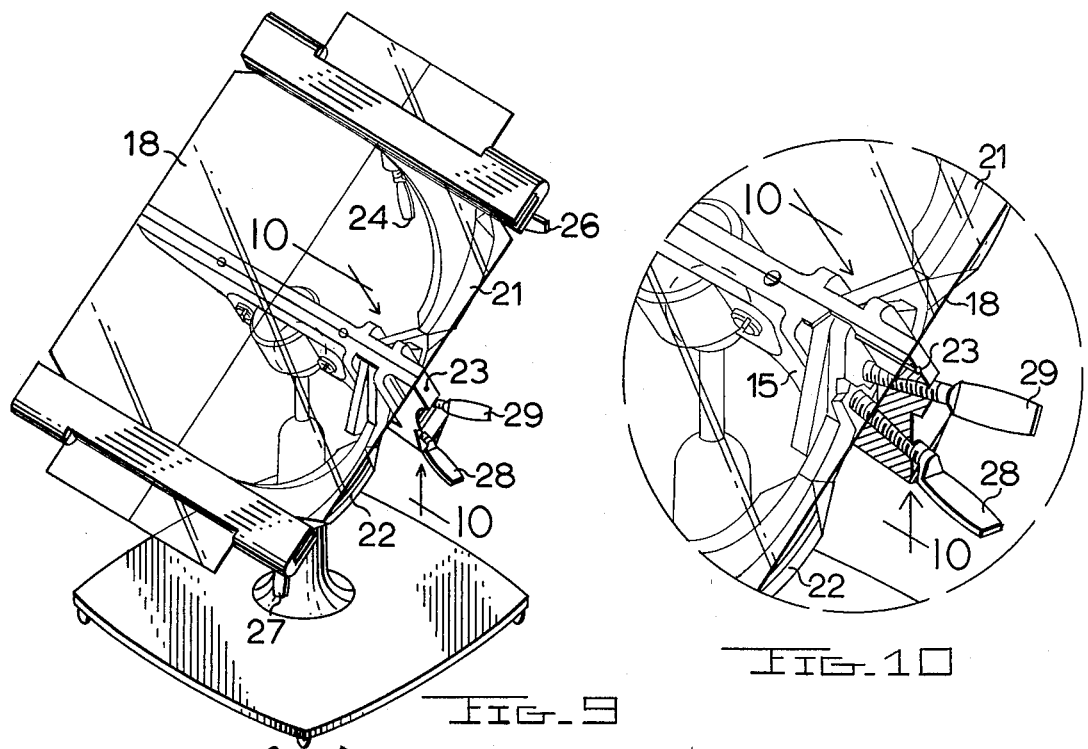
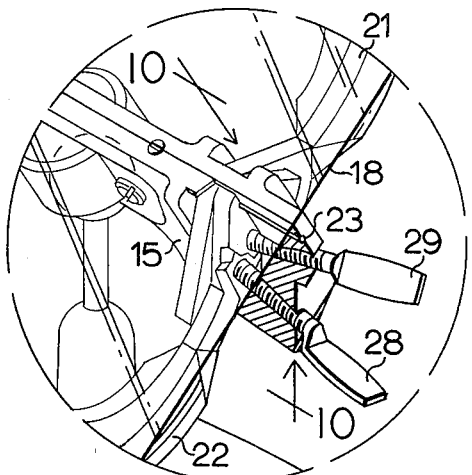
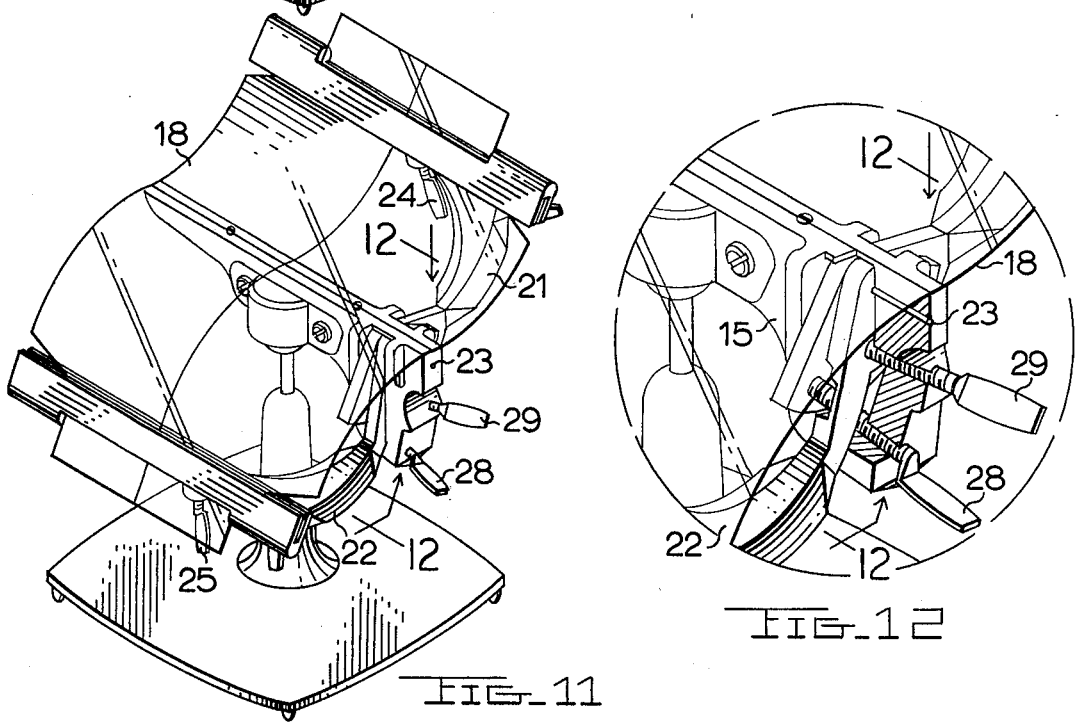
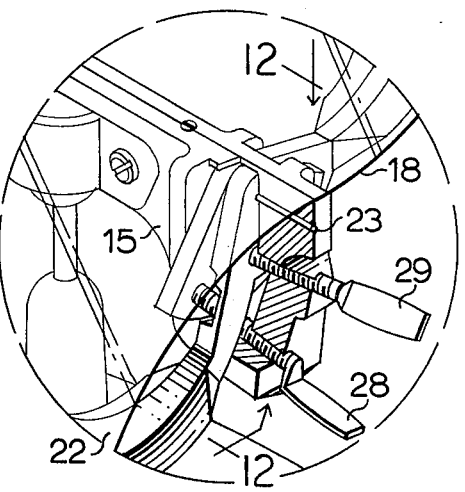

COPYHOLDER

This invention relates to a copyholder for use with photographic equipment in the graphic arts field. The copyholder utilizes art consisting of opaque copy material that is photographed by light reflected from the copy material. Thus, for example, art work on paper board or canvas, and other material constitute the general run of opaque copy material to be handled.

The copyholder embodying the present invention consists of a generally flat surface construction having a flexibility therein, said construction being pivotally secured to a horizontal axis center-arm functioning in both elevation and depression of the horizontal plane.

It is an object of the present invention to provide an improved copyholder device for a rapid system of creating pictorial graphic presentations of multiple straight plane variations.

It is an object of the present invention to provide an improved copyholding device for creating multiple perspective and surface curvature variations of fluctuating degrees in the elevation and depression of the horizontal plane.

The copyholder embodying the present invention consists of generally flat construction having flexibility therein with said construction being pivotally mobile and secured to a horizontal axis center arm.

Copyholder of the present invention permits opaque copy material to be both firmly retained and free in movement in the position of copying same at the control of the operator. Its advantages are with the mechanical simplicity in the movement of the embodying units that reduce working time.

Units or parts of this device can be formed by the injection mold process using materials such as rigid plastics or by the cast aluminum process.

In order that the invention may be fully understood, references will now be made to the drawings wherein an exemplary embodiment of the variations may be made without departing from the scope of the invention except as defined by the appended claims.

Figure 14:
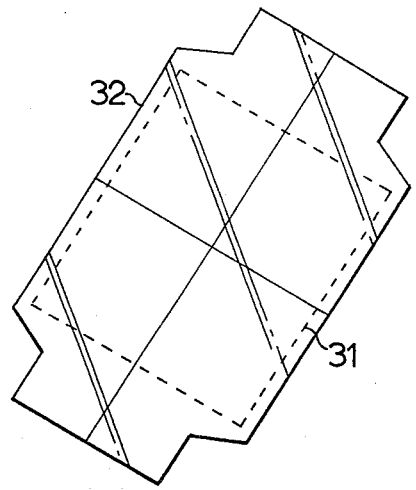
Figure 15:
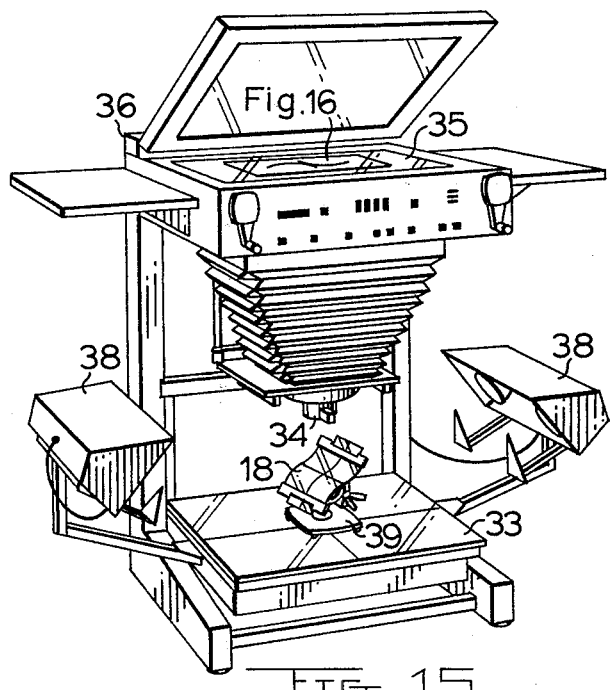
Figure 19:
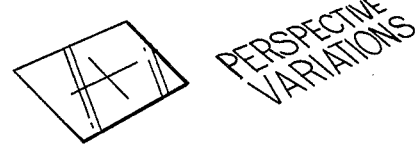
Figure 18:
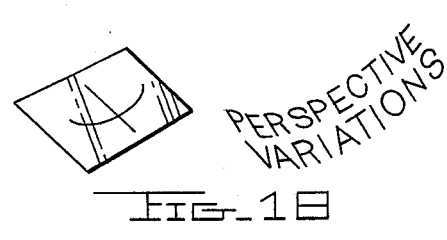
Figure 17:

FIG. 1 is a side view of the copyholder;
FIG. 2 is a top elevation of the copyholder;
FIG. 3 is a front view of the copyholder;
FIG. 4 is an underside perspective view of the copyholder;
FIG. 5 is a top sectional view of the copyholder in the concave position;
FIG. 6 is a top sectional view taken on the lines 6—6 of FIG. 5, illustrating the elevated swivel arms;
FIG. 7 is a top perspective view illustrating a convex position;
FIG. 8 is a top sectional view taken on the lines 8—8 of FIG. 7, illustrating the depressed swivel arms;
FIG. 9 is a top perspective view illustrating the straight angle position;
FIG. 10 is a top sectional view taken on the lines 10—10 of FIG. 9, illustrating the straight position of the swivel arms;
FIG. 11 is a top perspective view illustrating the S-curve position;
FIG. 12 is a top sectional view taken on the lines 12—12 of FIG. 11, illustrating the elevated swivel arm and the depressed swivel arm;
FIG. 13 is a top perspective view illustrating the straight position retained by the top insertion of an aluminum plate, 0.016 thickness, illustrating the pivot plastic ball position with broken line;
FIG. 14 is a top perspective view illustrating a paper contour top sheet having two imprinted-cross lines at the center showing the copy material area maximum with broken line;
FIG. 15 is a top perspective view of a photostat reproduction camera;
FIGS. 16 to 19 are diagrammatic perspective views of four basic design functions in the embodiment of the invention.

Referring now to the drawings wherein like reference characters designate like corresponding parts throughout the several views, there is illustrated in FIG. 4 an underside perspective view of a copyholder having a rod 11 threaded at both ends: the lower end is screwed into the square-shaped base 10 having four underside rubber rest points 9; the upper said end is screwed into a plastic ball 12. Said ball 12 is pivotally mobile and secured into the cavity formed by the center arm unit 15, and face plate 13, held in tension by two face plate tension screws 14. This provides the flexible plastic top surface sheet 18 with pivotal flexing in elevation and depression both above and below the horizontal plane with a 360-degree turning.

There is a channel at the front center arm unit 15 through which the right rear swivel arm 21 and the left front swivel arm 22 function side by side in both elevation and depression movement.

Said swivel arms 21 and 22 are enjoined together at the top by the axle pin 23 inserted from the front of the center arm unit 15 through the said swivel arm 22 into said swivel arm 21.

The front of the center arm unit has an upper front right lock screw 29 that locks the front left swivel arm 22 and a lower left lock screw 28 that locks the rear right swivel arm 21. The right rear end of the swivel arm 21 has an underside lock screw 24, functioning in the locked position only, making the rod axle 20 an integral part of the said swivel arm 21 and the right slotted-center bar 17. Said lock screw 24 is unlocked only for disassembly purposes in parts replacement.

The left rear end of the swivel arm 22 has an underside lock screw 25, functioning in the locked position only, making the rod axle 20 an integral part of the said swivel arm 22 and the left slotted-center bar 16. Said lock screw 25 is unlocked only for disassembly purposes in parts replacement.

Rod axle 20 embodies the right rear swivel arm 21 and the right end slotted-center bar 17, which has a frontal underside 30-degree lock screw 26 that locks a manually established curvature of the flexible plastic top sheet surface 18.

Rod axle 20 embodies the left frontal swivel arm 22 and the left end slotted-center bar 16 which has a frontal underside 30-degree lock screw 27 that locks a manually established curvature of the flexible plastic top sheet surface 18.

The center arm unit 15 has a flexible plastic top surface sheet 18, material can be of flexible plastic or thin metal, enjoined on its center to the center arm unit 15 by two flathead screws 40 with end extensions of said surface 18 traversing freely through the left end slotted-center bar 16 and the right end slotted-center bar 17 during manual adjustments to various degrees of elevation and depression both above and below the horizontal plane. Said surface 18 has two imprinted cross-lines at the center for aligning and sizing any of the diagrammatical layout applications illustrated in FIG. 16a thru d. The copy material area maximum is shown by broken line.

As in FIG. 5 of the drawing, the concave curvature surface on the flexible plastic top sheet 18 is manually formed by two adjustments: one adjustment being made with the left front swivel arm 22, which pivots on the axle pin 23 independently of the right rear swivel arm 21 elevating from 0- to 30-degrees variation above the horizontal plane, locked into position by the right frontal lock screw 29; the other adjustment being made with the right rear swivel arm 21, which pivots on the axle pin 23 independently of the left front swivel arm 22 elevating from 0- to 30-degrees vatiation above the horizontal plane, locked into position by the bottom left frontal lock screw 28, illustrated in FIG. 6. The formed concave curvature surface can be increased or decreased by slight adjustments of the right end slotted-center bar 16 and the left end slotted-center bar 17.

As in FIG. 7 of the drawing, the convex curvature surface on the flexible plastic top sheet 18 is manually formed by two adjustments: one adjustment being made with the left swivel arm 22, which pivots on the axle pin 23 independently of the right rear swivel arm 21 depressing from 0- to 30-degrees variation below the horizontal plane, locked into position by the top right frontal lock screw 29; the other adjustment being made with the right rear swivel arm 21, which pivots on the axle pin 23 independently of the left front swivel arm 22 depressing from 0- to 30-degrees variation below the horizontal plane, locked into position by the bottom left frontal lock screw 28, illustrated in FIG. 8. The formed convex curvature surface can be increased or decreased by slight adjustments of the right end slotted-center bar 16 and the left end slotted-center bar 17.

As in FIG. 11 of the drawing, the S-curve curvature surface on the flexible plastic top sheet 18 is manually formed by two adjustments: one adjustment being made with the left swivel arm 22, which pivots on the axle pin 23 independently of the right rear swivel arm 21 elevating from 0- to 30-degrees variation above the horizontal plane, locked into position by the top right frontal lock screw 29; the other adjustment being made with the right swivel arm 21, which pivots on the axle pin 23 independently of the left swivel arm 22 depressing from 0- to 30-degrees variation below the horizontal plane, locked into position by the bottom left frontal lock screw 28, illustrated in FIG. 12. The formed S-curve curvature surface can be increased or decreased by slight adjustments of the right end slotted-center bar 16 and the left end slotted-center bar 17.

As in FIG. 9 of the drawing, the straight plane top surface sheet 18 is repositioned after use in the concave, convex, or the S-curve positions by the following steps: unlocking the two side lock screws 26 and 27; followed with unlocking the two frontal lock screws 28 and 29; then placing the flexible plastic top surface sheet 18 and the device embodiment face down in an inverted position to form a straight plane. Said lock screws 26, 27, 28 and 29 are then locked into the straight position. The device is uprighted and a flat aluminum plate is inserted from the outside end of the right slotted-center bar 17, illustrated in FIG. 13, over the top of the said surface top sheet 18 and into the opposite left end slotted-center bar 16 to the aluminum end extensions.

The fixed center arm unit provides a pivotal action in both elevation and depression of a straight surface plane from 0- to 70-degrees and a traversing ball action in a 360-degree turning illustrated by a ball 12 shown by broken line in FIG. 13.

As in FIG. 14 of the drawing, a paper contour sheet 32 is duplicated in size to that of the flexible plastic top surface sheet 18, with end extensions slightly undersize for allowing free movement through the slotted-center end bars 16 and 17. Said sheet 32 has two cross-lines for centering opaque copy material adhered to same within the shown broken line area of maximum copy limit.

As in FIG. 15 of the drawing, is an illustration of a photostat reproduction camera 36: embodying a copy board of said camera 33; a glass film plane 35 of said camera; a lens 34 of said camera; and the light source 38 of said camera.

The device 39 is illustrated in use with said camera 36, with example of S-curve position given to opaque copy material inserted on the inventions top surface sheet 18, positioned and aligned on the center-cross lines of said camera copy board 33.

Figure 16:
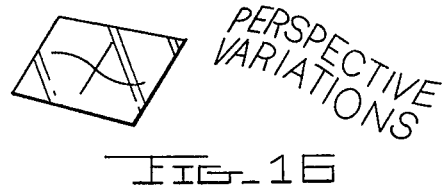

The top of said camera back is raised, illustrating the desired design specifications as indicated on the marked clear acetate film 37d, illustrated in FIG. 16, positioned on the surface of said camera film plane 35 with the center lines aligned and sized by manual adjustments to the plastic top surface sheet 18, illustrated in FIG. 15 of inserted opaque copy material in the nature of logos, trademarks, symbols, or general graphic art copy to the design specification.

Photostat reproduction camera procedures, with the use of the invention, are made by the said camera lens 34. Said lens 34 is opened to the widest aperture for alignment of said opaque copy material to the design specification example illustrated in FIG. 16 of 37d, with alignment attained by manual adjustments of said copy placed on the top surface sheet 18, illustrated in FIG. 15, to the satisfaction of the operator. The said camera lens 34 is closed to the smallest aperture for greater depth of field in the focus for the elevation and depression of the top surface plane of the invention. Material 37d, in FIG. 16 of the drawing, is cleared from the camera glass film plane 35. The camera back is closed and made ready for camera film exposure.

It will be obvious to those skilled in the art that many modifications may be made within the scope of the present invention without departing from the spirit thereof, and the invention includes all such modifications.

What is claimed is:

1. A copyholder for Photostat reproduction camera work comprising a top surface sheet of generally square shape and attached to a center arm unit, a flexible plastic top surface sheet provides a carrier base for opaque copy material, said material being adhered to a paper contour size duplicate of the plastic top surface sheet of slight undersize for ease of movement and having two imprinted cross-lines on its surface with two end extensions functioning in end slotted-center bars for free movement of the plastic top surface sheet, the two slotted-center end bars are enjoined by an axle rod to two swivel arms that traverse side by side, independently of each other, in a forward channel housing of the center arm unit pivoting at the top by means of an axle pin insert, a concave surface curvature is manually formed by elevating the right and the left swivel arms which function independently of each other above the horizontal plane with 0- to 30-degrees of adjustment, said swivel arms are locked into position by two frontal-lock screws and by two forward-angled, side lock screws, a top surface sheet is attached on the center by two flat-head screws to the center arm unit for additional pivotal manual adjustments of the top surface sheet on a horizontal 360-degree turning, last said mentioned means are attached to the standards being the rod and the base of the invention.

2. A copyholder for Photostat reproduction camera work comprising a top surface sheet of generally square shape and attached to a center arm unit, a flexible plastic top surface sheet provides a carrier base for opaque copy material, said material being adhered to a paper contour size duplicate of the plastic top surface sheet of slight undersize for ease of movement and having two imprinted cross-lines on its surface with two end extensions functioning in end slotted-center bars for free movement of the plastic top surface sheet, the two slotted-center end bars are enjoined by an axle rod to two swivel arms that traverse side by side, independently of each other, in a forward channel housing of the center arm unit pivoting at the top by means of an axle pin insert, a convex surface curvature is manually formed by depressing the right and the left swivel arms that function independently of each other below the horizontal plane with 0- to 30-degrees of adjustment, said swivel arms are locked into position by two frontal-lock screws and by two forward-angled, side lock screws, the top sheet is attached on the center by two flat-head screws to the center arm unit for additional pivotal manual adjustments of the top surface sheet on a horizontal 360-degree turning, last said mentioned means are attached to the standards being the rod and the base of the invention.

3. A copyholder for Photostat reproduction camera work comprising a top surface sheet of generally square shape and attached to a center arm unit, a flexible plastic top surface sheet provides a carrier base for opaque copy material, said material being adhered to a paper contour size duplicate of the plastic top surface sheet of slight undersize for ease of movement and having two imprinted cross-lines on its surface with two end extensions functioning in end slotted-center bars for free movement of the plastic top surface sheet, the two slotted-center end bars are enjoined by an axle rod to two swivel arms that traverse side by side, independently of each other, in a forward channel housing of the center arm unit pivoting at the top by means of an axle pin insert, an S-curve surface curvature is manually formed by two adjustments: one adjustment is manually formed by depressing the left swivel arm that functions independently of the right swivel arm below the horizontal plane with 0- to 30-degrees adjustment, said swivel arms being locked into position by the top right lock screw and one forward-angled, left side lock screw; the other adjustment is manually formed by elevating the right swivel arm which functions independently of the left swivel arm above the horizontal plane with 0- to 30-degrees of adjustment, said swivel arms being locked into position by the lower left lock screw and the forward-angled, right side lock screw, the top sheet is attached on the center by two flat-head screws to the center arm unit for additional pivotal manual adjustments of the top surface sheet on a horizontal 360-degree turning, last said mentioned means are attached to the standards being the rod and the base of the invention.

4. A copyholder for Photostat reproduction camera work comprising a straight top surface or plane of generally square shape, attached to a center arm unit housing a socketed ball, last said mentioned means are attached to the standards being the rod and the base of the invention, the socketed ball is held in tension by a face plate and two screws for on-center pivotal elevations and depressions both above and below the horizontal plane with 0- to 30-degrees of manual adjustment having additional straight plane 360-degree turning, a locked straight surface plane is made with a flat aluminum sheet inserted thru two slotted-center end bars over the top surface sheet neutralizing the concave, convex, and the S-curve positions, opaque copy material to be used is adhered to the inserted flat sheet of aluminum positioned for general use of the invention.

* * * * *